May 13, 1969  R. T. FUJIOKA ET AL  3,443,571
FOAMING APPARATUS AND METHOD
Filed Oct. 24, 1966  Sheet 1 of 2
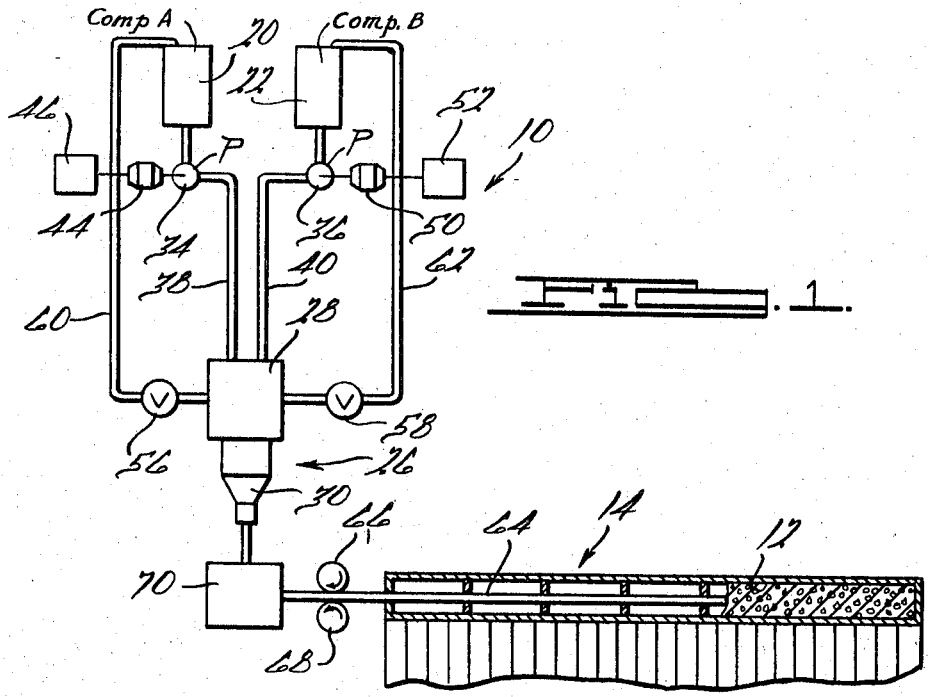
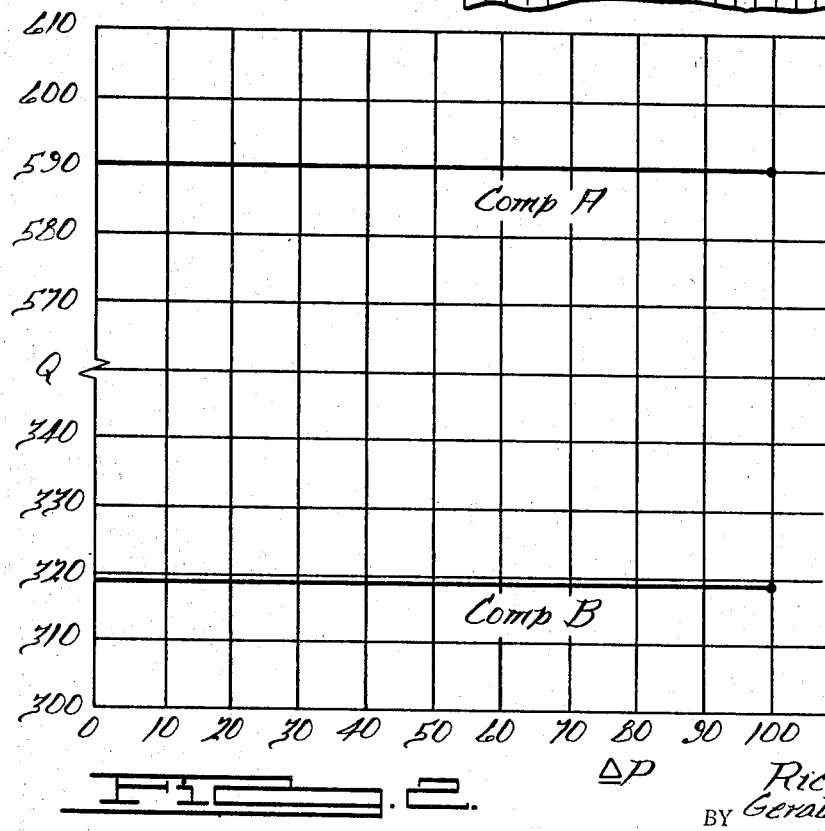
INVENTORS.
Richard T. Fujioka,
Gerald A. Wooldridge
BY Harness, Dickey & Pierce
ATTORNEYS.

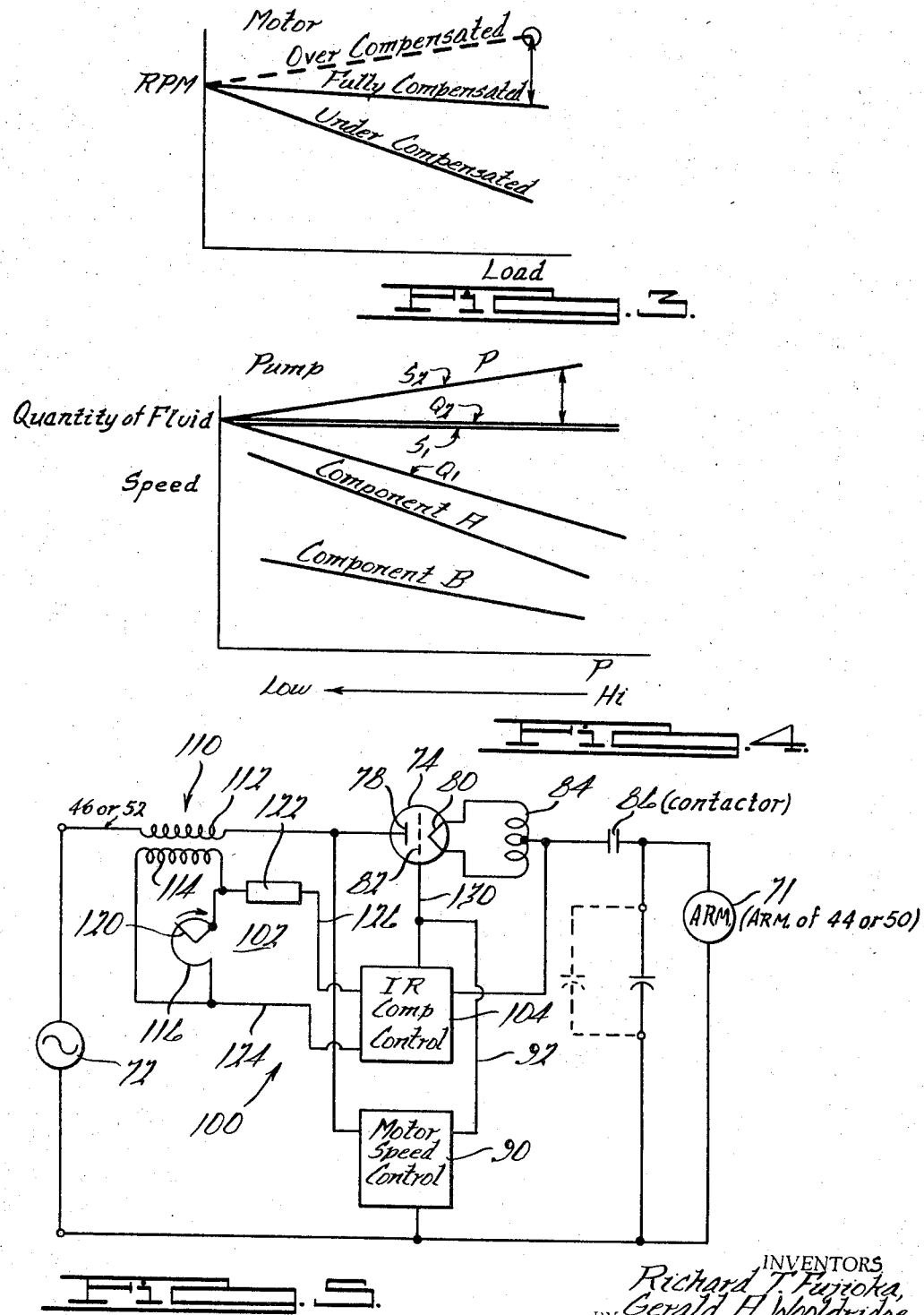

United States Patent Office 3,443,571
Patented May 13, 1969

3,443,571
FOAMING APPARATUS AND METHOD
Richard T. Fujioka, 1848 Lakeview Drive, Oxford, Mich. 48051, and Gerald A. Wooldridge, 23161 Greencrest, St. Clair Shores, Mich. 48080
Filed Oct. 24, 1966, Ser. No. 588,861
Int. Cl. E04g 21/00; B29b 1/04
U.S. Cl. 137—7                                    19 Claims

ABSTRACT OF THE DISCLOSURE

A method and apparatus for foaming a cavity with a product formed of constituent elements by inserting a tube into the cavity, withdrawing the tube during the process, and varying the control of the pump driving the constituent elements in response to the sensed instantaneous line pressure.

This invention relates generally to cavity insulating apparatus and, more particularly, to a system for controlling the flow of fluid material into a cavity wherein the pressure of the fluid is variable.

In recent years, the foamed-in place method of insulating cavity structures, such as walls of rail cars, trailer trucks and the like, has gained wide acceptance. Such a method is disclosed in applicant's copending application Ser. No. 184.048 filed Apr. 2, 1962 or Method of Insulating Cavities, now Patent No. 3,242,240, and Ser. No. 352,757 filed Mar. 18, 1964 for Tube Handling Apparatus, now Patent No. 3,329,160. In the foregoing applications, plurality of retractable tubes are built into the wall to be insulated upon fabrication thereof so as to extend through the cavities therein. A foam supply nozzle capable of delivering cellular foam at a preselected volume rate is fitted within a remote end of each of the cavities to inject cellular foam through the tubes and into the cavities while at the same time withdrawing the tubes from the cavities at a predetermined rate. Thus a controlled amount of foam is deposited throughout the particular cavity and, when the tubes are completely withdrawn from the cavities, the vehicle walls will have been completely insulated and ready for use.

In utilizing the foregoing foaming methods, it has been the normal practice to provide an apparatus for supplying cellular foam which includes apparatus for supplying a first constituent of the cellular foam, usually referred to as component A or an activator and an apparatus for supplying a second constituent, usually referred to as component B or the resin element. The two constituent materials are then fed to a mixing head which combines the constituents into a product material which is then fed into the tubes within the cavities to be foamed. As stated above, the foaming tubes are then withdrawn from the cavity at a preselected rate in order to completely foam the cavity with a uniform density in a direction from the most remote point of the cavity to a near-at-hand point.

As will be apparent from the following discussion, a problem arises while utilizing the foregoing methods of foaming cavities in place in maintaining a controlled rate of flow of both constituent elements of the cellular foam material and maintaining a constant rate. As is readily apparent, during the period when the tube is being withdrawn from the cavity during the foaming process, the line pressure present in the tubing varies in direct proportion to the length of the tubing. In utilizing the method of the latter filed application mentioned above, the tubing within the cavity is continuously shortened at a controlled rate as the tube is being withdrawn from the cavity. Thus the foaming pressures are greatest when the foaming process is initially started, and is steadily decreased as the tube is withdrawn from the cavity. It has further been found that the load on the motor driving the constituent element pumps is direcly related to line pressure and thus the motor load decreases as a direct relationship with a decreasing line pressure. Similarly, the speeds of both the motors and the pumps driven by the motor are directly related to the load on the motor in the particular motors being utilized in systems of the type described above.

With a varying motor speed, the pump speed is accordingly varied and the quantity of each constituent material being pumped to the mixing head varies in accordance with the pump speed. Accordingly as the line pressure decreases, the load on the motor correspondingly decreases and the pump speed increases in accordance with the load on the motor. However, the quantity of material being fed to the mixing head increases in accordance with the decreasing line pressure thereby varying the amount of foam being delivered to the foaming tubes.

As a further consideration, the constituent elements being of different viscosity results in different effects with varying line pressure on the quantity of constituent elements being delivered to the mixing head. Accordingly a decrease in line pressure will cause component A to increase its rate of flow at a lesser rate than a corresponding decrease in line pressure will cause component B to increase its rate of flow. Accordingly, it is desirable to provide an apparatus for controlling the rate of flow which is individual to each source of constituent material being fed to the mixiing head in the situation of a foaming apparatus.

While the following system will be described under the assumption that the tube within the cavity is withdrawn at a constant velocity, it is to be understood that the system may be utilized in a situation where the velocity of the tube withdrawal is varied. As will be seen from the following description, the system senses the instantaneous line pressure, thus providing a continuous sensing system for providing a product delivery rate which is a function of the line pressure. This is true for a variation in product delivery rate from a constant delivery rate for a constant tube withdrawal velocity to one which varies in accordance with the tube withdrawal velocity to provide a constant density of material in the cavity.

In accordance with certain principles of the present invention, the aforementioned deficiencies of certain prior art systems are alleviated in providing a control of the constituent material pumping apparatus in accordance with the ultimate sensing of the fluid conditions being delivered to the mixing head. In a specific illustration of the present invention, a motor-pump arrangement is utilized to pump each of the constituent elements or materials from a reservoir to the mixing head. Means are provided for sensing the loading of the pumping apparatus. In the specific illustration, the motor load current is sensed, and a feedback signal is provided to compensate for the tendency of the system to vary the constituent rates of flow in accordance with the variation in line pressure. As discussed above, this decrease in line pressure is due to the decrease in length of the tubing being fed from the mixing head.

Accordingly it is one object of the present invention to provide an improved apparatus for delivering fluid of a varying pressure to a cavity.

It is another object of the present invention to provide an improved apparatus for delivering a constant rate of flow of a constituent fluid irrespective of variations in line pressure of the fluid delivering apparatus.

It is still a further object of the present invention to provide an improved apparatus for delivering a fluid compound wherein the variation in line pressure of the compound varies and the system maintains a constant rate of flow of the constituent elements of the compound.

It is still another object of the present invention to provide a constant rate of flow apparatus for delivering fluid to a fluid line wherein the pressure in the line is variable and wherein the fluid characteristics are sensed to compensate the pumping apparatus for the variations in line pressure.

It is still a further object of the present invention to provide an improved pumping apparatus for pumping a fluid through a line wherein electrical characteristics of the pumping apparatus are sensed to provide a constant rate of fluid flow irrespective of changing fluid characteristics in the system.

Further objects, features and advantages of this invention will become apparent from a consideration of the following description, the appended claims and the accompanying drawings in which:

FIG. 1 is a schematic diagram of an apparatus for foaming a cavity and particularly illustrating the fluid system for the A and B component elements and the mixing head;

FIG. 2 is a chart illustrating the particular operating quantities and pressures for the A and B components to be utilized in connection with FIG. 1;

FIG. 3 is a straight line graph illustrating the relationship of the motor speed with respect to motor load;

FIG. 4 is a straight line graph illustrating the variation in pump output in respect to pressure both for a compensated and overcompensated pump and further illustrating the change in flow quantities for components A and B as the line pressure varies; and FIG. 5 is a schematic diagram illustrating one form of compensating circuit which is adapted to be utilized in connection with the system of FIG. 1.

Referring now to FIG. 1, there is illustrated a foaming apparatus 10 which is constructed to foam a cavity 12 formed in the wall construction of a trailer 14. It is to be understood that the cavity 12 in trailer 14 is shown purely for illustrative purposes and the foregoing system may be utilized in foaming any cavity or area. Specifically, the foaming apparatus includes a first storage tank 20 for storing a quantity of the component A material and a second storage tank 22 for storing a quantity of the component B material. The contents of the storage tanks 20 and 22 are fed to a mixing apparatus 26 which generally includes a metering apparatus 28 and a mixing head 30. The fluid from storage tanks 20 and 22 are fed to the mixing head 30 by means of a first pump 34 and a second pump 36 and a pair of conduits 38 and 40 which interconnect the pumping apparatus 34 and 36 with the mixing head 30.

The pump 34 is adapted to be driven by a motor 44, the motor 44 being controlled by an electrical control circuit 46, to be hereinafter explained in conjunction with the description of FIGURE 5. Similarly the pump 36 is driven by a motor 50, the motor being controlled by a control circuit 52 which, in the preferred embodiment, is identical to the control circuit 46.

The system is initially calibrated for flow rates at varying pressures by means of the metering apparatus 28 wherein material is passed through conduits 38 and 40 into the apparatus 28 and thence is returned to the storage tanks 20 and 22 by means of valves 56, 58 and conduits 60, 62. The metering apparatus 28 contains suitable storage tanks and a valving apparatus to control the flow of material to conduits 38 and 40 and also to variably control the line pressure being applied to conduits 38 and 40. As is readily apparent, this system is utilized to simulate the effects of an actual flow of fluid through the mixing head to the cavity 12 to initially calibrate the system. The line pressure conditions of an actual foaming operation may be simulated by any suitable apparatus and is incorporated, in the disclosed system, in the apparatus 28.

In initially setting up the cavity for foaming, an elongated tubular member 64 is inserted into the cavity and extends from one end of the cavity to the other. The tubular member is passed through a pair of driven roller members 66, 68 and inserted into a tube slitting and cutting apparatus 70, as disclosed in the latter aforementioned copending application. Thus, during the foaming process, the tubular member 64 is withdrawn from the cavity 12 at a controlled rate thereby inserting foam into the cavity 12 in a progressive, constant speed movement from the rear of the cavity to the front. As the tube is withdrawn, the tube 64 is split and cut into pieces by the apparatus 70.

Referring now to FIG. 2 there is illustrated one sample ratio of components A and B which may be utilized with the system of FIG. 1. The chart illustrates a quantity of fluid for each component which may be utilized with respect to the change in line pressure. As is to be noted from the foregoing description of FIG. 1, during the withdrawal of the tube 64, the line pressure on the tube 64 is gradually decreased as a linear function of the decrease in length of the tube. This line pressure is transmitted back to the line 38, 40 and thence to the pumps 34, 36, as is well known in the art. However, as is seen from FIG. 2, it is imperative that the quantity of fluid being delivered both from the component A and component B reservoir be relatively constant in spite of a variation in line pressure. Accordingly, if the system is adjusted to meet the requirements illustrated in FIG. 2, the rate of total flow from the tube 64 will remain relatively constant thereby foaming the cavity 12 with a constant density. Also the proportions of components A and B will not vary with the line pressure. As will be seen hereinafter, the effect of line pressure on each of the components A and B is different due to the different density of the various components, thus necessitating the individual control of the effects of line pressure on each component pumping system to thereby maintain a constant rate of feed of both components A and B. Thus, a constant rate of feed of the total foaming material is maintained.

Referring to the motor characteristics, as illustrated in FIG. 3, it is seen that the speed of the motor has a tendency to vary in accordance with the load thereon. Referring particularly to the under-compensated curve, it is seen that the speed of the motor drops in accordance with a linear relationship as the load on the motor is increased, for the particular type of motor being utilized. As is known in the art, this drop in speed is due to a decrease in armature voltage caused by a greater voltage drop in the armature circuit in response to an increased current being drawn therethrough. This drop in armature voltage may be compensated by any known compensation system wherein the armature voltage is steadily increased to compensate for the increased drop in the armature windings due to the larger load current.

In the situation where the speed of the motor remains relatively constant with load, the motor may be said to be fully compensated; however, when the motor speed drops with increased load, the motor is said to be under-compensated. Similarly, the motor may be over-compensated to cause a rise in motor speed as the armature current is increased. Normally a motor is adjusted to be fully compensated and not over-compensated due to certain erratic speed characteristics introduced into the motor electrical system at the high load condition. As will be seen hereinafter, the system of the present invention, as specifically disposed, includes an over-compensated motor to compensate for slippage present in most pump units being utilized for systems of this type.

This slippage characteristic of the pump is illustrated in FIG. 4 where is illustrated a graph representing the change in quantity and speed being delivered by the pump in accordance with variations in line pressure. Also the graph of FIG. 4 illustrates the variation in quantity of the constituent components of the foaming material as they vary with line pressure and illustrates the relative component variation, one to the other, in accordance with the variations in line pressure. Referring particularly to the S1 curve, it is seen that the speed is held relatively constant with a change in pressure.

However, the quantity of fluid being delivered to the tube 64 decreases with an increase in pressure and contrariwise increases with a decrease in pressure. Thus, as the tube is withdrawn from the foamed cavity, the quantity of fluid being delivered for a constant rate of withdrawal of the tube 64 from the cavity increases thereby increasing the density of foam as the tube nears the outer end of the cavity. As stated above, this is an unwanted feature in that it is desired to foam the cavity with a constant density.

However, if the speed of the pump is increased to a high level at high line pressures and decreased therefrom in accordance with the graph illustrated in FIG. 4, a constant quantity of fluid will be delivered to the foaming apparatus as the pressure decreases. Thus as the apparatus starts the foaming process at a high line pressure due to the length of the delivering tube, a high pump speed illustrated along line S2 is provided by increasing the r.p.m. of the motor driving the pump. As the pressure is lowered, due to the decreasing of the length of the tube, the pump speed is decreased at such a rate as to maintain the quantity being delivered to the tube at a relatively constant level as illustrated by curve Q2. It has been found that in order to maintain a constant quantity of fluid being delivered, the motor must be over-compensated as illustrated in the dotted curve of FIG. 3. In this way the quantity of fluid delivered to the mixing head is maintained at a relatively constant level.

FIG. 4 also includes curves labeled component A and component B curves, which illustrate the relative variation of delivery of the quantity of component A and component B to the mixing head as the line pressure decreases. As is seen, component A increases in delivered quantity at a relatively greater rate as the line pressure is decreased than the rate of increase of delivery rate of component B. This disparity in rate of quantity delivered with respect to variation in line pressure is due to the physical characteristics of the materials involved. The curves are intended to be purely illustrative and it is to be understood that a variation in the materials being utilized in the foaming process will vary the relative curves illustrated as component A and component B curves.

However, as is seen from the component A and component B curves, it is necessary to individually vary the compensation of the motor pump combination of the individual pumps associated with component A and component B. Thus the compensation of the component A pump will be greater and the motor will have a greater over-compensation characteristic than the motor associated with the pump delivering the component B material. Accordingly, the system must be initially calibrated at the operating pressures for a constant delivery of both component A and component B and also for the proportions of component A and component B desired.

Referring now to FIG. 5 there is illustrated one preferred form of motor compensation circuit which is adapted. The system includes a motor armature circuit 71, which may represent the armature of either motor 44 or 50 which is fed a rectified alternating current electrical energy from an AC source 72 through a controlling element 74, as for example a thyratron. The thyratron 74 includes plate 78, cathode 80 and grid 82 electrode, as is common in the art. The cathode electrode is interconnected with the armature 70 through an inductor element 84 and a set of contactors 86, the latter of which is utilized in energizing and de-energizing the motor 70. Thus the current to the armature 70 is controlled by the thyratron 74, thereby controlling the speed of the motor.

As is conventional in the art, a motor speed controller 90 is interconnected with the grid electrode 82 by means of a conductor 92 whereby the grid electrode is rendered more positive to raise the armature voltage, thereby raising the motor speed. Contrariwise, the grid electrode 82 may be rendered less positive thereby lowering the motor speed. The speed control for the motor 70 may be accomplished in any conventional manner known to the art.

In order to provide the compensated feature described in conjunction with FIGURE 3, an IR drop compensation control system 100 is provided and includes an armature load sensing system 102 for sensing the load current being fed to the armature circuit 70 and an IR compensation control circuit 104 which is utilized to raise and lower the voltage being fed to the grid electrode in accordance with the sensed motor load or armature current. This system is shown purely for illustrative purposes and it is to be understood that other characteristics of the system may be sensed, as for example the line pressure, component line pressure, etc. Similarly, other elements may be controlled in response to the sensed condition, as for example, elements of the pump, characteristics of the line, etc.

The motor load sensing circuit 102 includes a current transformer 110 including a primary winding 112 in series circuit with the motor armature 70 and a secondary winding 114 which is magnetically coupled with the primary winding 112. The voltage developed across the secondary winding 114 is fed to a potentiometer 116. The voltage on the potentiometer may be varied to vary the operating level thereof by means of a slider 120 and the voltage of the potentiometer 116 is fed to the IR compensation control system 104 through a resistor 122 and conductors 124, 126. The output of the IR compensation control 104 is fed to the grid electrode 82 by means of a conductor 130 to raise the potential of the grid 82 in accordance with an increase in sensed current being fed through primary winding 112. Thus, the potential of the grid electrode 82 is made more positive in accordance with an increase in sensed armature current, and the potential of the gid electrode 82 is lowered in accordance with a lowering of the sensed armature current. Thus the voltage being fed to the armature is raised and lowered in accordance with a rise and fall of the armature load current, respectively.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. For use with a pumping system including pumping subsystems for delivering a plurality of constituent materials of a chemical product at a varying product line pressure, a control apparatus for controlling the rate of delivery of each of the constituent materials in response to the varying line pressure comprising means for sensing a condition in each subsystem indicative of the variation in product line pressure and means for regulating the pumping rate of each subsystem for providing a product delivery rate which is a function of the line pressure of the product while maintaining a constant ratio of constituent materials.

2. The control apparatus of claim 1 wherein said last named means maintains the pumping rate of each subsystem to provide constant product delivery rate.

3. The control apparatus of claim 1 wherein each pumping subsystem includes a motor-pump combination and the sensed condition of each subsystem includes the sensing of the motor loads.

4. The control apparatus of claim 3 wherein the pump fluid slippage of each subsystem is compensated through the regulation of the pumping rate.

5. The control apparatus of claim 1 wherein the constituent materials are of different physical characteristic so that the line pressure affects the pumping rate of each subsystem in accordance with the difference in physical characteristic and the product line pressure, and the means for adjusting the pumping rate of each subsystem is separately adjustable to compensate for the varying effect of the product line pressure on the pumping subsystem due to the difference in physical characteristic.

6. The control apparatus of claim 3 wherein the means for adjusting the pumping rate of each subsystem includes means for sensing the load current of the motor and means for adjusting the electrical energy for energizing the motor to adjust the pumping rate of each subsystem.

7. The control apparatus of claim 6 wherein the sensed load current is the armature current and the means for adjusting the energization electrical energy includes means for increasing the armature voltage in accordance with an increasing line pressure.

8. The control apparatus of claim 7 wherein said armature current varies in accordance with the constituent material line pressure, and the motor is over-compensated to provide a rising armature voltage in accordance with a rising constituent line pressure.

9. The control apparatus of claim 1 further including a drive motor for each pumping subsystem for providing power to pump the constituent material to the product line, the motor including a control circuit for controlling the voltage being fed to the armature of the motor and wherein the means for adjusting the pumping rate of each subsystem includes means for sensing the armature load current and generating a control signal in response thereto and feedback circuit means for adjusting the control circuit to raise the armature voltage being fed to the motor in accordance with said control signal and at a greater rate of change than the rate of change of the armature load current.

10. The control apparatus of claim 9 wherein the control circuit includes an impedance device in circuit with the electrical energy supply and the armature circuit, the impedance device varying its impedance in accordance with the said control signal.

11. For use with a pumping system including pumping subsystems for delivering a plurality of constituent materials of a chemical product at a varying product line pressure, a method for controlling the rate of delivery of each of the constituent materials in response to the varying line pressure comprising the steps of sensing a condition in each subsystem indicative of the variation in product line pressure and regulating the pumping rate of each subsystem for providing a product delivery rate which is a function of the line pressure of the product while maintaining a constant ratio of constituent materials.

12. The method of claim 11 wherein the pumping rate of each subsystem is maintained to provide a constant product delivery rate.

13. The method of claim 11 wherein each pumping subsystem includes a motor-pump combination and the step of sensing a condition of each subsystem includes the step of sensing the motor load current.

14. The method of claim 13 wherein the step of regulating the pumping rate includes compensating for fluid slippage of the pump.

15. The method of claim 11 wherein the constituent materials are of different physical characteristics so that the line pressure affects the pumping rate of each subsystem in accordance with the difference in physical characteristic and the product line pressure, and the step of adjusting the pumping rate of each subsystem includes the steps of separately adjusting the constituent line pressures to compensate for the varying effects of the product line pressure on the pumping subsystem due to the difference in physical characteristic.

16. The method of claim 13 wherein the step of adjusting the pumping rate of each subsystem includes the step of sensing the load current of the motor and the step of adjusting the electrical energy for energizing the motor to adjust the pumping rate of each subsystem.

17. The method of claim 16 wherein the sensed load current is the armature current and the step of adjusting the energization electrical energy includes the step of increasing the armature voltage in accordance with an increasing line pressure.

18. The control apparatus of claim 17 wherein said armature current varies in accordance with the constituent material line pressure, and the step of increasing the armature voltage in accordance with an increase in armature current is sufficient to overcompensate the motor and provide an increased rate of armature voltage rise as compared with the rising constituent line pressure.

19. The method of claim 18 further including a drive motor for each pumping subsystem for providing power to pump the constituent material to the product line, the motor including a control circuit for controlling the voltage being fed to the armature of the motor and wherein the method step of adjusting the pumping rate of each subsystem includes the step of sensing the armature load current and generating a control signal in response thereto and the step of adjusting the control circuit to raise the armature voltage being fed to the motor in accordance with said control signal and at a greater rate of change than the rate of change of the armature load current.

References Cited

UNITED STATES PATENTS

| 1,452,265 | 4/1923 | Collins et al. | 137—7 |
| 3,232,097 | 2/1966 | Childs et al. | 137—7 |
| 2,849,015 | 8/1958 | Colson | 137—98 |
| 3,023,764 | 3/1962 | Dooley et al. | 137—98 |

NATHAN L. MINTZ, *Primary Examiner.*

U.S. Cl. X.R.

137—98